(12) United States Patent
Iseli

(10) Patent No.: US 8,151,669 B2
(45) Date of Patent: Apr. 10, 2012

(54) METHOD OF AND DEVICE FOR PRODUCING BAND SAW BLADES

(75) Inventor: Benno Iseli, Schötz (CH)

(73) Assignee: Iseli & Co. AG Maschinenfabrik, Schötz (CH)

( * ) Notice: Subject to any disclaimer, the term of this patent is extended or adjusted under 35 U.S.C. 154(b) by 73 days.

(21) Appl. No.: 12/804,264

(22) Filed: Jul. 16, 2010

(65) Prior Publication Data

US 2011/0030510 A1 Feb. 10, 2011

(30) Foreign Application Priority Data

Jul. 16, 2009 (CH) ...................................... 1119/09

(51) Int. Cl.
*B23D 65/00* (2006.01)
(52) U.S. Cl. .................... 76/112; 76/34; 76/45; 76/50.2; 76/75; 76/78.1
(58) Field of Classification Search .................... 76/112, 76/25.1, 27, 34, 37, 45, 46, 47.1, 50.2, 50.4, 76/74–77, 78.1, 79, 79.5, 80.5, 85, 88, 89, 76/115, 101.1; 83/13, 788
See application file for complete search history.

(56) References Cited

U.S. PATENT DOCUMENTS

| | | | | |
|---|---|---|---|---|
| 3,315,548 A | * | 4/1967 | Anderson et al. ............... | 76/112 |
| 4,426,894 A | * | 1/1984 | Nicolodi ........................... | 76/54 |
| 4,852,430 A | * | 8/1989 | Oppliger et al. .................. | 76/27 |
| 5,016,497 A | * | 5/1991 | Sundstrom ..................... | 76/25.1 |
| 5,826,465 A | * | 10/1998 | Iseli ................................ | 76/112 |
| 5,931,057 A | * | 8/1999 | Beck et al. ....................... | 76/27 |
| 6,374,703 B1 | * | 4/2002 | Schurb et al. ..................... | 76/40 |
| 6,543,433 B2 | | 4/2003 | Iseli | |
| 6,631,658 B2 | * | 10/2003 | Brown ............................. | 76/37 |

FOREIGN PATENT DOCUMENTS

| | | |
|---|---|---|
| AT | 385 453 | 8/1985 |
| DE | 1 951 765 | 5/1970 |
| SE | 524 430 | 12/2002 |

* cited by examiner

*Primary Examiner* — Phong Nguyen
(74) *Attorney, Agent, or Firm* — Pauley Petersen & Erickson

(57) ABSTRACT

A method and device for producing band saw blades, particularly for the timber-processing industry. A blank band saw blade is produced from a metal band, such as a metal band that can be stored on a roll. Several metal bands are combined into a flush metal band packet which can be introduced into a saw band grinding machine. The metal bands are pressed onto a planar guide. The metal band packet is clamped and a grinding machine operates to produce a desired saw tooth profile. A pawl is introduced into a tooth profile which is ground into the metal band packet. The clamped metal band packet is then loosened and advanced with a predetermined tooth spacing.

20 Claims, 5 Drawing Sheets

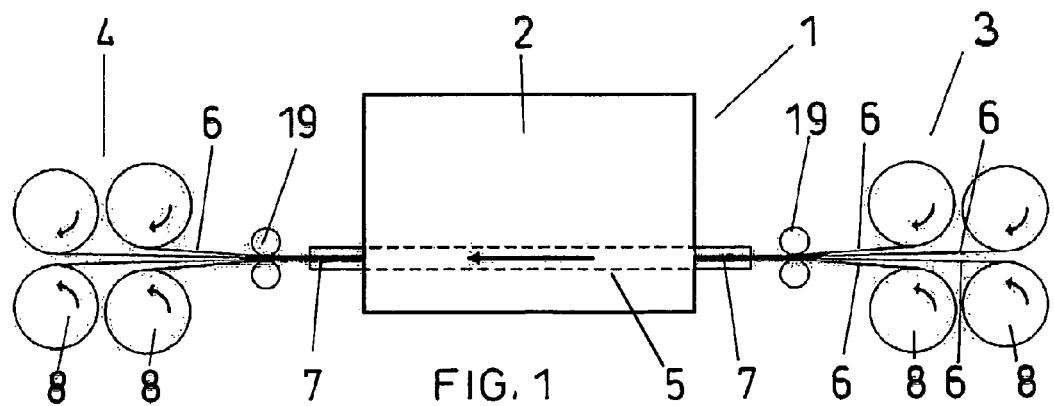
FIG. 1
FIG. 2
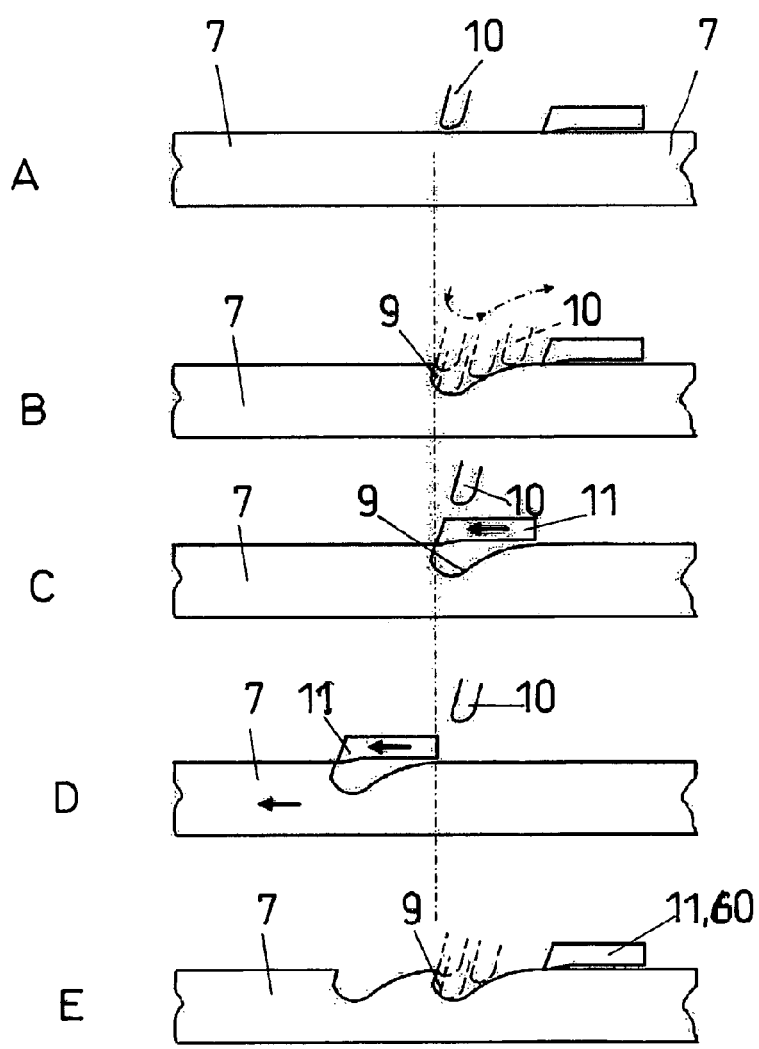

METHOD OF AND DEVICE FOR PRODUCING BAND SAW BLADES

BACKGROUND OF THE INVENTION

1. Field of the Invention

This invention relates to a method of producing band saw blades for the timber-processing industry, wherein initially a band saw blank is produced from a metal band from a roll, from which subsequently through cutting to length and welding together continuous band saw blades can be produced or provided with hard metal teeth. This invention also relates to a device for implementing the method provided with a saw blade grinding machine, with a supply, a computer and a control unit for inputting a programmed tooth geometry where the program stages necessary for production, with a grinding blade which can be moved at least along an x axis and a y axis, as well as with a guide for guiding the metal bands to be ground and an advancing device to move the metal bands to be ground.

2. Discussion of Related Art

Historically, saw blades made by craftsmen were originally always ground directly from a metal sheet or a metal band, but this production method has been abandoned in industrial manufacturing for about 50 years. Then, band saw blades were produced as blanks in a first production stage through stamping out a metal band. Here, a single metal band from a roll or a reel is continuously stamped and rolled up again. In a following stage this blank is ground to a final form by a grinding machine and then appropriately deflected and welded together to form continuous band saw blades. After application of the appropriate hard metal teeth, further grinding takes place.

In published German Patent Application DE 19 517 65, this production process is described as the state of the art.

From Swedish Patent Specification SE 524430, a method is known for producing saw blades through a sequence of hole stampings. Austrian Patent Specification AT-385453B also discloses a production method in which the saw blade is stamped as a blank in a first stage, in a second stamping process teeth are formed, and in a final working stage the teeth are ground into their end form.

In many cases, the saw blade blanks are not self-produced but are obtained from a stamping plant. Thus, depending on other requirements in each case, stamping tools are produced and the stamped saw blade blanks are stored in the form of rolled metal bands. Given the number of possible saw tooth geometries with different tooth shapes and different tooth spacings, this requires relatively large stocks to be held and correspondingly managed. If the required blanks are not in stock, users often have to put up with relatively long delivery times, particularly with smaller order quantities where it is hardly worthwhile having a required material made just for this order quantity.

In the current production method, the blanks are inserted into the grinding machine and individually ground with precision into their final form. Because current grinding machines are very powerful, the grinding process is now relatively fast. Working on several blanks at the same time is thus conceivable. Although the performance of the machines would allow this, it cannot be carried at a reasonable expense. If pre-stamped bands are combined, it would not only be necessary to ensure that they lie level on each other but also that they are fed accurately spaced, such as without displacement in the longitudinal direction over the entire length of all bands. Realistically, this is not feasible.

SUMMARY OF THE INVENTION

One object of this invention is to provide a method of producing band saw blades of the type mentioned above but in which the costs of stamping tools can be avoided, storage reduced and thus a relatively rapid and cost-effective production process is made available.

This objective is achieved by a method with the processing steps in accordance with features of the method set forth in the claims and this specification, particularly in view of the following description with reference to the drawings.

BRIEF DESCRIPTION OF THE DRAWINGS

The method in accordance with this invention can be implemented with a band saw grinding machine of a type conventionally used with relatively low additional equipment costs, and a device for implementing the method having forms of embodiments of such a device set forth in the claims, in view of this specification and the following drawings, wherein:

FIG. 1 is a schematic plan view of an entire device in which passing of the metal bands through a grinding machine and rolling up of the saw blade blanks is shown;

FIG. 2 schematically shows an actual production in accordance with one embodiment of steps of the method of this invention;

DETAILED DESCRIPTION OF INVENTION

Figure 4:
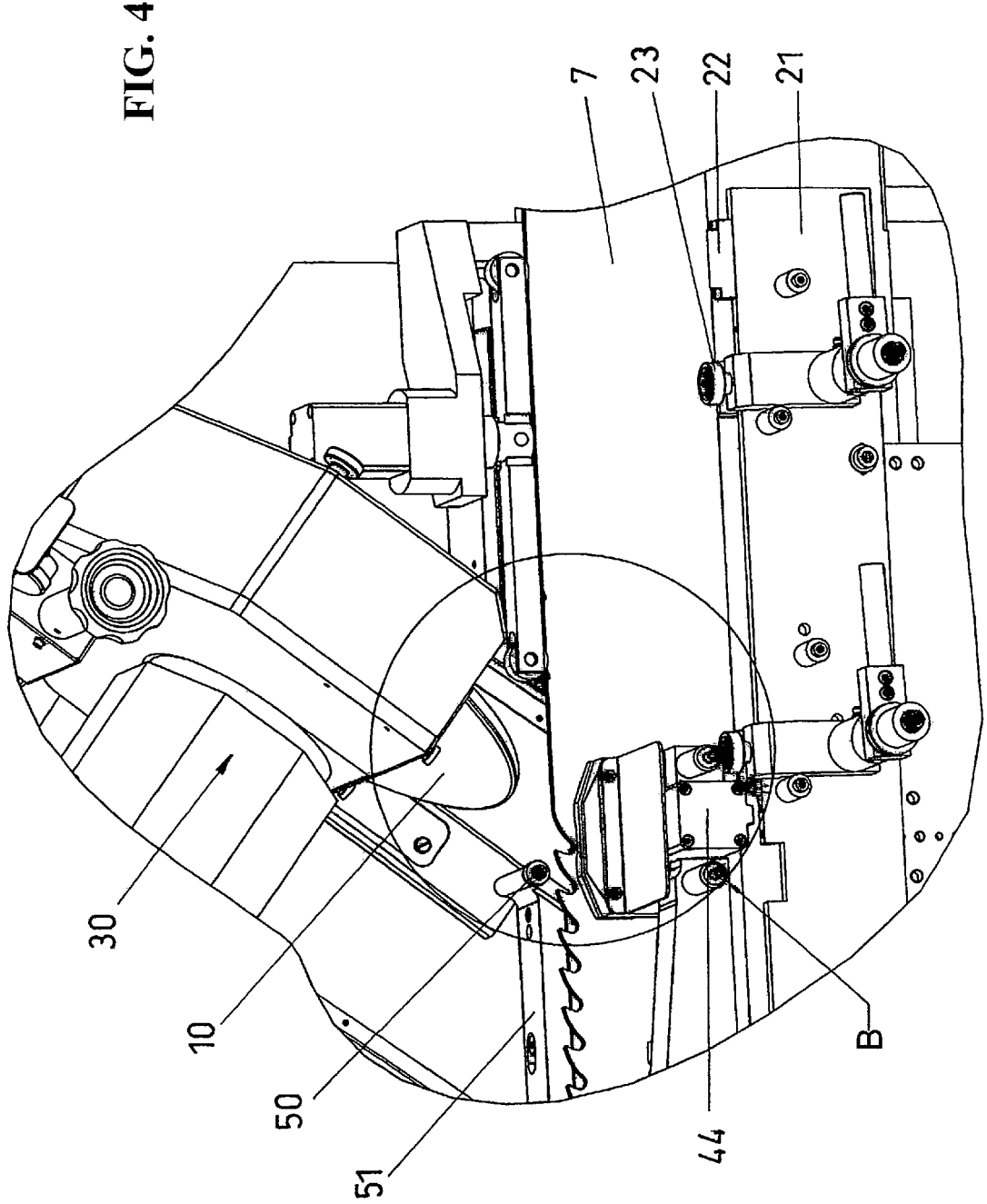
FIG. 4 shows an enlarged perspective view of section A shown in FIG. 3.

In FIG. 1, the entire device is denoted by element reference numeral 1. The device 1 comprises a saw band grinding machine 2, the outline plan of which is shown schematically. The saw band grinding machine 2 is preceded by an unrolling unit 3. Arranged after the saw band grinding machine 2 there is also a rolling up unit 4. Both the unrolling unit 3 and the rolling up unit 4 comprise a multiplicity of reels or coils 8. From these reels or coils 8, metal bands 6 are first removed and after processing rolled up again in the rolling up unit 4. From the individual metal bands 6, one metal band 7 is formed. For this the individual metal bands are bundled, so that they lie on top of each other without gaps and are pressed together by pressing roller 19 so that the bands lie flat on each other. In the horizontal direction, the backs of the metal bands 6 rest on a guide while passing through the saw band grinding machine 2. The guide 5 is described in more detail later, with respect to FIG. 4.

FIG. 1 thus shows the processing steps of: (A) continuous removal of several metal bands from reels; (B) combining the metal bands to form one flush metal band package; (C) introduction of the metal band package into a grinding machine; (D) a final step of pressing metal package onto the flat guide 5; and (E) separation of the metal band ground to blank band saw bands and rolling-up thereof.

FIG. 2 shows the actual grinding steps in partial Figures A to E. Element reference numeral 7 denotes the metal band package 7, which now the package 7 is shown from above, in contrast to FIG. 2 which is shown laterally. Above the metal band package 7 is a grinding disk 10 in its initial position. The metal band package 7 is now held clamped together and is worked with the grinding disk 10 so that a first tooth contour is ground, as shown in FIG. 2B. The complex grinding path is shown as a dashed and dotted line. In this way, a first saw tooth 9 is produced. The first saw tooth 9 is thus shaped in all the metal bands 6 of the metal band package 7.

With the formation of the first saw tooth 9, indexing occurs and a feed pawl 11 is now moved into the formed saw tooth 9. The feed pawl 11 is in contact with a flank of the formed saw tooth 9, as shown in FIG. 2C. The feed pawl 11 then advances the metal bank package 7 by one tooth spacing. This advancing is shown in FIG. 2D. A first cycle is now completed and the feed pawl 11 moves back into the rest position and a second tooth 9' is formed, as shown in FIG. 2E. In the same way, blank saw blades are produced from the metal bands 6.

Figure 3:
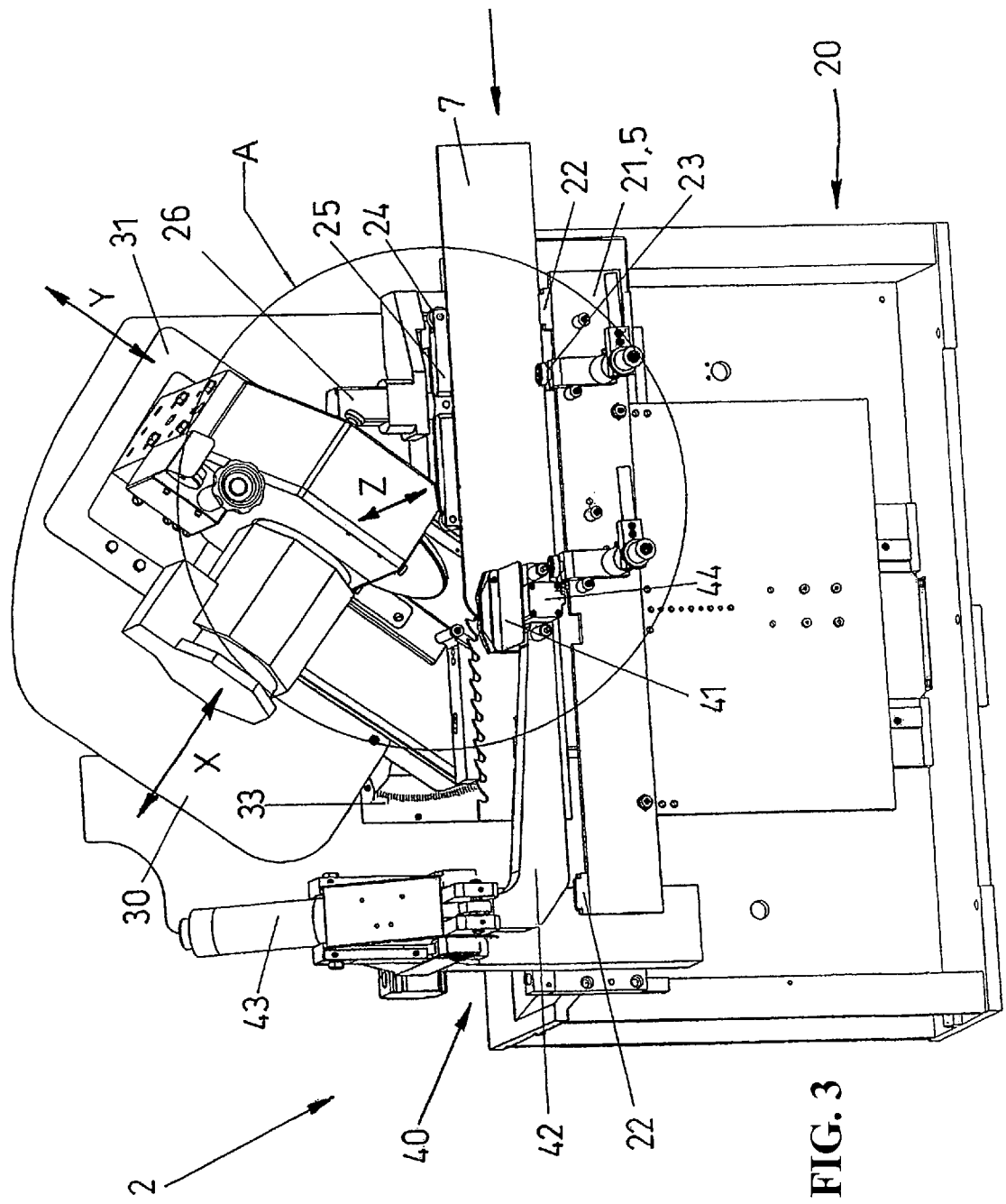
FIG. 3 shows a perspective view of a saw band grinding machine for implementing the method in accordance with one embodiment of this invention.

According to the method of this invention, an appropriately modified known saw band grinding machine is used. Such a saw band grinding machine 2 is shown in perspective in its entirety in FIG. 3. However, components such as various drives, control units or programming units are not shown in FIG. 3. The saw band grinding machine 2 has a machine chassis 20. All the functional components are directly or indirectly arranged on the chassis 20. More particularly, a guide beam 21 is shown as part of the entire guide 5. The guide beam 21 has sliding guide shoes 22 which are arranged at least at the front and the rear end of the guide beam 21. The backs of the metal bands 6 combined into a metal band packet 7 rest on the sliding guide shoes 21. Adjustable guide pressing rollers 23 are also on the guide beam 21. The guide pressing rollers 23 are adjustable in order to be able to be adapted to the thickness of the metal band packet 7, and also to be adjusted in terms of a pressing position. For guiding the metal band packet 7 there are press rollers 24 which press on the top of the metal band packet 7 and thus run on the upper longitudinal edge of the metal bands 6. The press rollers 24 are in a pressing device 25 on which a pressing cylinder 26 acts.

Element reference numeral 30 denotes a grinding head of the saw band grinding machine 2. The grinding head 30 has a drive motor which drives the grinding disk 10. The grinding head 30 can be moved in a grinding head bed in its longitudinal direction X as well as is in its lateral direction Y. For the metal band packets 7 up to a thickness of a few millimeters, these movement axes are completely sufficient. In the case of thicker metal band packets 7, rounding the grinding disk leads to the metal bands 6 in the center of the metal band packet 7 being ground differently from the metal bands 6 located outermost in metal band packet 7. However, this can be prevented by providing the grinding head 30 with a further movement axis Z. For this, a guide can be provided in the guide bed 31 perpendicular to its plane or the entire grinding head bed 32 supported therein and moveable in the Z axis. The movement in the Z axis is a pure pendulum movement which overlaps the movement of the grinding path. The angle of the X axis or its deviation from the horizontal or vertical can be read off an angle scale. Control of the movements of the grinding head bed 32 and/or the grinding head 10 occur by a control or controller which is not shown.

The area of the metal band packet 7 being worked by the grinding disk 10 is compressed during grinding. Thus, the clamp or clamping means 40 is located on the machine chassis 20. The clamping means 40 has a clamping head 41 which is on a clamping arm 42. A clamping pressure cylinder 44 acts on the clamping arm 42. The counterpressure for the clamping head 41 is behind the metal band packet 7 in this view and is not visible. The counterpressure device can comprise a simple planar slide plate on which the metal band packet 7 rests. It is conceivable for the planar counterclamping plate to be adjustable to thus allow centering of the metal band packet 7 so that the tangential point of contact of the grinding disk 10 can be adjusted to the center with regard to the thickness of the metal band packet 7. However, if as described above, the grinding head 30 can also be moved in the Z axis such adjustability would be superfluous.

Although, as described above the cylinder 43 is used via the clamping arm 42 to press the clamping head 41 onto the metal band packet 7, the cylinder 43 is only designed to lower the clamping arm 42. This allows height-adjustment of the clamping head 41 with regard to a width of the metal bands 6. A pressing cylinder 44 is then additionally present on the actual clamping head 41. However, the clamping head 41 is always in contact with a certain sufficient pressure to ensure a secure guidance of the entire metal band package 7, whereas the pressing cylinder 44 produces the actual pressing force used for stabilization during the grinding process, as described above.

Figure 5:
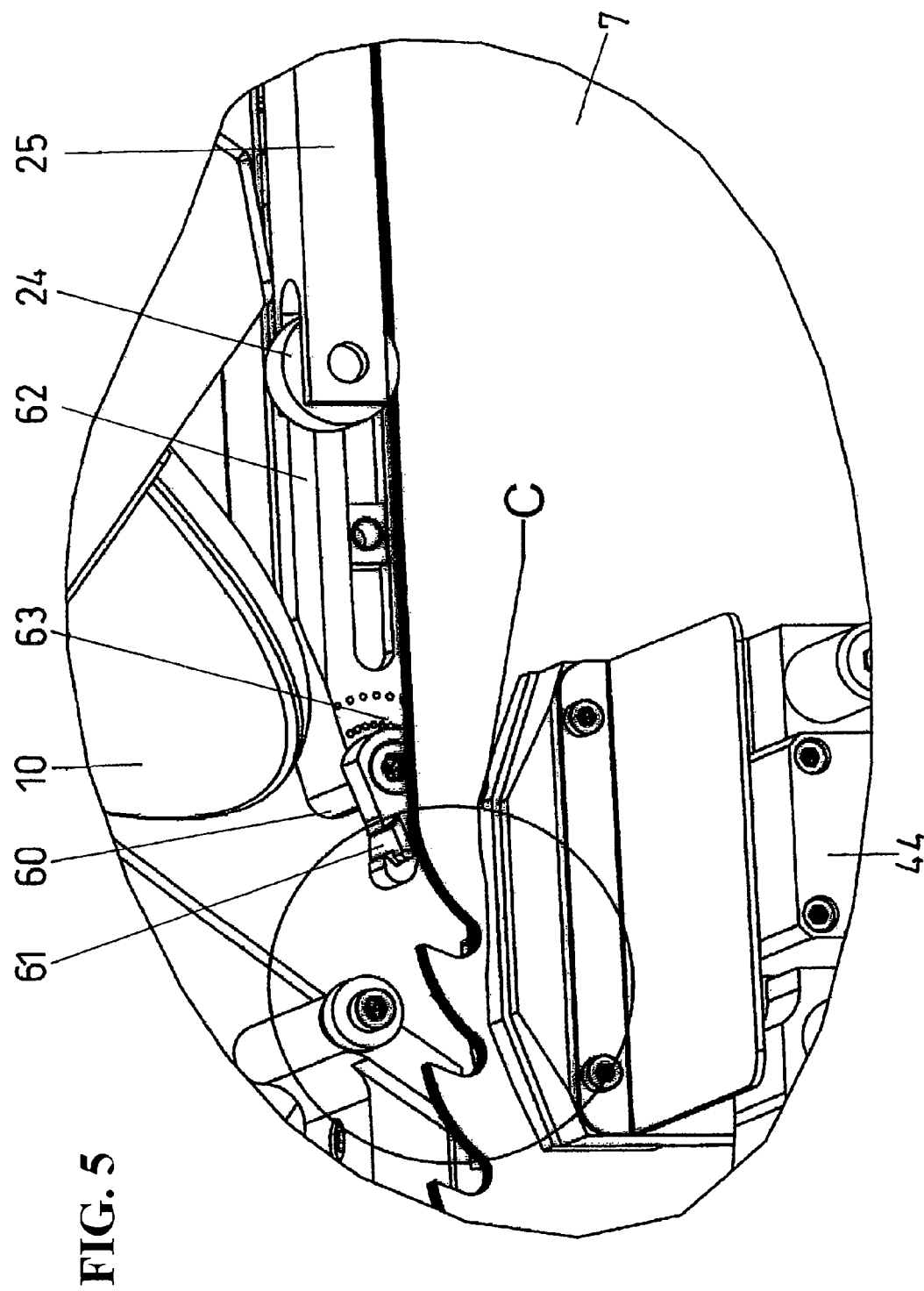
FIG. 5 shows an enlarged perspective view of area B shown in FIG. 4.

With regard to the grinding position in the direction of movement of the metal band packet 7, a drawing off tool 50 is shown located downstream. The drawing off tool 50 is held on a fixed tool holder 51. Because a high degree of precision of the grinding process is required, at regular intervals the grinding disk 10 is newly profiled by the drawing off tool 50. Thus, the grinding head 30 is brought into an appropriate elevated position and the grinding head 30 is moved in accordance with the control unit so that the grinding disk 10 is newly profiled. This process is preferably carried out every 10 to 50 grinding cycles, for example. However, according to experience, even with a thick metal band packet 7, it is sufficient to carry out the drawing-off procedure after every 20 teeth cut into the metal band packet 7. As discussed in view of FIG. 2, after every grinding step the metal band packet 7 is advanced by one spacing step. This takes place by a feed pawl 60. The feed pawl 60 is shown in detail in FIG. 5. The feed pawl 60 is affixed to a feed pawl sled 62. The feed pawl sled 62 is movable parallel to the course of the metal band packet 7. The actual feed pawl 60 can be pivoted relative to the feed pawl sled 62. The feed pawl 60 holds an exchangeable feed pawl insert 61. After some 100 to 1000 advancing actions, a certain amount of wear can also occur on the feed pawl insert 61. The feed pawl insert 61 is thus replaced after certain periods of time. Expediently, the insert 61 is also made of a hardened material so that the wear is kept to a minimum, as wear, even though very minor, can accumulate to result in more major errors.

Figure 6:
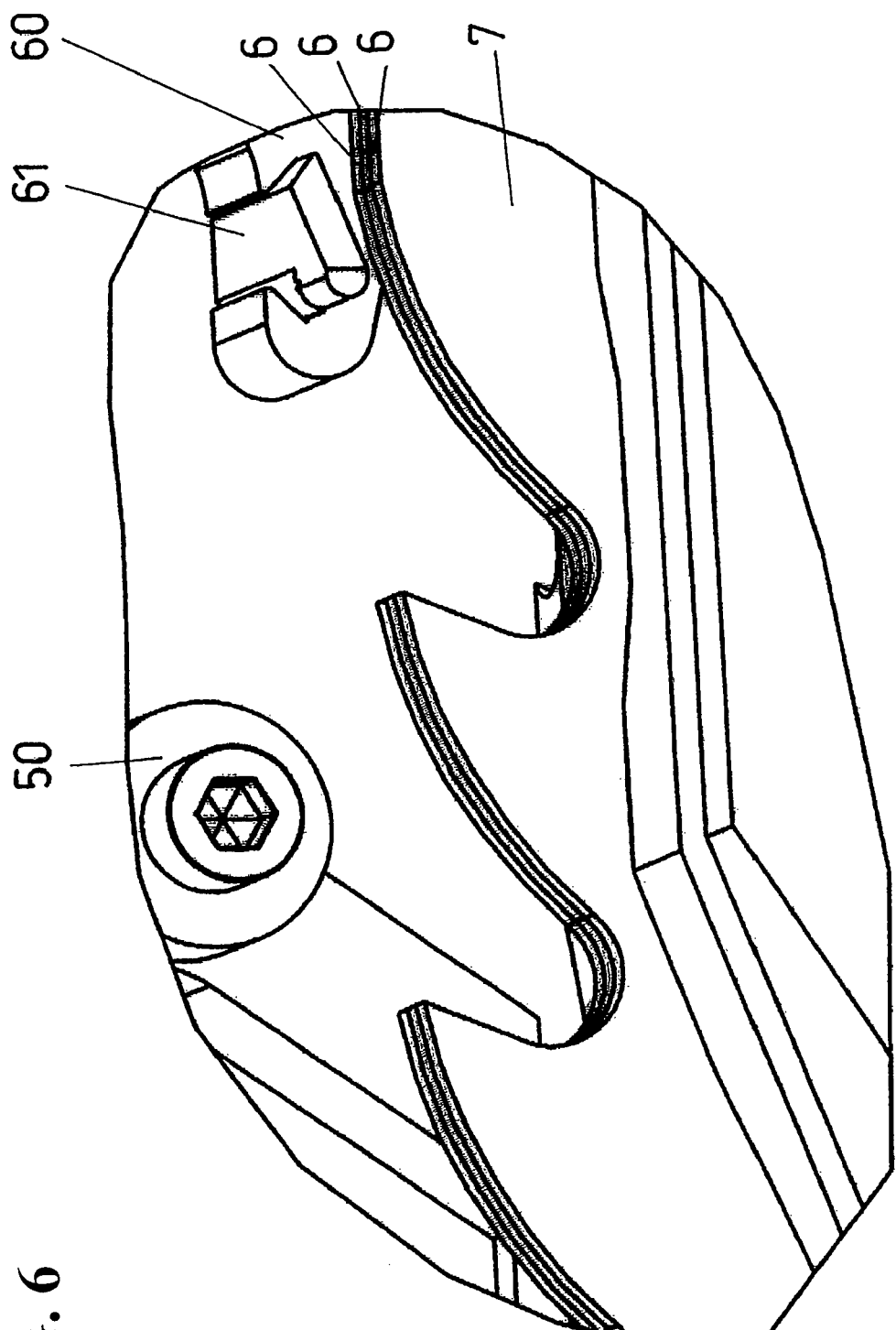
FIG. 6 shows an enlarged view of detail C in FIG. 5.

Finally, FIG. 6 shows the metal band packet 7 in an enlarged section so that the individual metal bands 6 are shown lying on top of each other. In FIG. 6, only three superimposed metal bands 6 are shown, and hardly any limits can be imposed. This is also because the metal band packet 7 passes through in an absolutely straight line. Thus, there are no relative displacements of the bands 6. Thus, displacements do not occur the metal band packet 7 can be of practically any thickness. However, depending on the thickness of the individual metal bands 7, the overall weight can be kept within reasonable limits and in practice if between three and eight metal bands 6 are combined into the metal band packet 7.

In principle, the metal bands 6 of the metal band packet 7 can already be cut to certain predetermined lengths immediately after the grinding process. This is especially so if a largely finished product is already present and the grinding work is carried out in a company which then produces the finished continuous saw bands. Preferably, however, after the grinding process the individual metal bands 6 of the metal band packet 7 are separated again then rolled individually onto the reels 8.

Swiss Patent Reference 01119/09, filed 16 Jul. 2009, the priority document corresponding to this invention, to which a foreign priority benefit is claimed under Title 35, United States Code, Section 119, and its entire teachings are incorporated, by reference, into this specification.

What is claimed is:

1. A method for producing band saw blades for a timber-processing industry, wherein initially a blank band saw blade is produced from a metal band from a roll, from which subsequently through cutting to length and welding together, continuous saw blades are formed which can have hard metal teeth, the method including the steps of:
   (a) continuously unrolling a plurality of the metal bands (6) from upstream reels (8);
   (b) combining the metal bands (6) into a flush metal band packet (7);
   (c) introducing the metal band packet (7) into a saw band grinding machine (2);
   (d) pressing the metal bands (6) onto a planar guide (5);
   (e) clamping (40, 44) the metal band packet (7) laterally to a direction of travel;
   (f) operating a grinding procedure to a desired saw tooth profile;
   (g) introducing a feed pawl (60) into a tooth profile (9) ground into the metal band packet (7);
   (h) loosening clamping of the metal band packet (7) and advancing with a predetermined tooth spacing while reducing a pressing of the metal band packet (7) onto the planar guide (5); and
   (i) repeating steps (d) to (h) until the reels on an input side are practically empty.

2. In the method in accordance with claim 1 wherein following the grinding procedure the individual metal bands (6) of the metal band packet (7) are separated and again rolled up on downstream reels (8).

3. In the method in accordance with claim 1 wherein the grinding procedure which is carried out by a profiled grinding disk (10) is interrupted after a predetermined number of teeth (9) is produced in the metal band packet (7) and the grinding disk (10) is withdrawn precisely in an intermediate step.

4. In the method in accordance with claim 3 wherein a predeterminable number of the teeth (9) to be ground is between 15 and 30 before the grinding disk is removed.

5. In the method in accordance with claim 1 wherein between three and five metal bands (6) are combined into one metal band packet (7).

6. In the method in accordance with claim 1 wherein five or more metal band (6) are combined into one said metal band packet (7).

7. In the method in accordance with claim 6 wherein in addition to movements (x, y) in a longitudinal direction and a height direction necessary for forming the teeth, the grinding disk (10) performs an additional movement (z) perpendicularly to a metal band surface.

8. In the method in accordance with claim 7 wherein the additional movement (z) is carried out as a cyclical pendulum movement which is superimposed on a tooth-forming movement.

9. In the method in accordance with claim 8 wherein a device for implementing the method includes a saw band grinding machine (2) with a memory, a computer and control unit for inputting a programmed tooth geometry and program steps required for production, a grinding disk (10) movable at least in an x-axis and a y-axis, a guide (5) guiding the metal bands (6) to be ground and an advancer (60-63) for advancing the metal bands to be ground, wherein upstream of the device are a plurality of the metal band reels (8) and guide rolls combining the metal bands (6) from the metal band reels (8) into a compact continuous said metal band packet (7), in an area of the guide (5) the grinding machine (2) having at least one pair of pressing rollers (24) which with a pressing cylinder (26) presses backs of the metal bands onto a planar guide (5), and a clamping device (40) which on both sides hold the metal band packet (7) close to an area being ground.

10. In the method in accordance with claim 9 wherein downstream and upstream of the saw band grinding machine (2) a number of the reels (8) are provided.

11. In the method in accordance with claim 7 wherein the grinding disk (10) is movable along a z-axis.

12. In the method in accordance with claim 9 wherein the grinding machine has a pivotable feed pawl (60) which is moveable in a longitudinal direction of the metal band packet (7) and is held in a feed pawl sled (62).

13. In the method in accordance with claim 9 wherein the advancer is a movable feed pawl (60) in which a replaceable feed pawl insert (61) is held.

14. In the method in accordance with claim 9 wherein a fixed drawing-off tool (50) is on a tool holder in an area above a location through which the metal band packet (7) passes.

15. In the method in accordance with claim 9 wherein the clamping device (40) comprises a clamping head (41) arranged on a height-adjustable clamping arm (42) with a pressing cylinder (44).

16. In the method in accordance with claim 1 wherein a device for implementing the method includes a saw band grinding machine (2) with a memory, a computer and control unit for inputting a programmed tooth geometry and program steps required for production, a grinding disk (10) movable at least in an x-axis and a y-axis, a guide (5) guiding the metal bands (6) to be ground and an advancer (60-63) for advancing the metal bands to be ground, wherein upstream of the device are a plurality of the metal band reels (8) and guide rolls combining the metal bands (6) from the metal band reels (8) into a compact continuous said metal band packet (7), in an area of the guide (5) the grinding machine (2) having at least one pair of pressing rollers (24) which with a pressing cylinder (26) presses backs of the metal bands onto a planar guide (5), and a clamping device (40) which on both sides hold the metal band packet (7) close to an area being ground.

17. In the method in accordance with claim 2 wherein a device for implementing the method includes a saw band grinding machine (2) with a memory, a computer and control unit for inputting a programmed tooth geometry and program steps required for production, a grinding disk (10) movable at least in an x-axis and a y-axis, a guide (5) guiding the metal bands (6) to be ground and an advancer (60-63) for advancing the metal bands to be ground, wherein upstream of the device are a plurality of the metal band reels (8) and guide rolls combining the metal bands (6) from the metal band reels (8) into a compact continuous said metal band packet (7), in an area of the guide (5) the grinding machine (2) having at least one pair of pressing rollers (24) which with a pressing cylinder (26) presses backs of the metal bands onto a planar guide (5), and a clamping device (40) which on both sides hold the metal band packet (7) close to an area being ground.

18. In the method in accordance with claim 3 wherein a device for implementing the method includes a saw band grinding machine (2) with a memory, a computer and control unit for inputting a programmed tooth geometry and program steps required for production, a grinding disk (10) movable at least in an x-axis and a y-axis, a guide (5) guiding the metal bands (6) to be ground and an advancer (60-63) for advancing the metal bands to be ground, wherein upstream of the device are a plurality of the metal band reels (8) and guide rolls combining the metal bands (6) from the metal band reels (8) into a compact continuous said metal band packet (7), in an area of the guide (5) the grinding machine (2) having at least one pair of pressing rollers (24) which with a pressing cylinder (26) presses backs of the metal bands onto a planar guide (5), and a clamping device (40) which on both sides hold the metal band packet (7) close to an area being ground.

19. In the method in accordance with claim 4 wherein a device for implementing the method includes a saw band grinding machine (2) with a memory, a computer and control unit for inputting a programmed tooth geometry and program steps required for production, a grinding disk (10) movable at least in an x-axis and a y-axis, a guide (5) guiding the metal bands (6) to be ground and an advancer (60-63) for advancing the metal bands to be ground, wherein upstream of the device are a plurality of the metal band reels (8) and guide rolls combining the metal bands (6) from the metal band reels (8) into a compact continuous said metal band packet (7), in an area of the guide (5) the grinding machine (2) having at least one pair of pressing rollers (24) which with a pressing cylinder (26) presses backs of the metal bands onto a planar guide (5), and a clamping device (40) which on both sides hold the metal band packet (7) close to an area being ground.

20. In the method in accordance with claim 7 wherein a device for implementing the method includes a saw band grinding machine (2) with a memory, a computer and control unit for inputting a programmed tooth geometry and program steps required for production, a grinding disk (10) movable at least in an x-axis and a y-axis, a guide (5) guiding the metal bands (6) to be ground and an advancer (60-63) for advancing the metal bands to be ground, wherein upstream of the device are a plurality of the metal band reels (8) and guide rolls combining the metal bands (6) from the metal band reels (8) into a compact continuous said metal band packet (7), in an area of the guide (5) the grinding machine (2) having at least one pair of pressing rollers (24) which with a pressing cylinder (26) presses backs of the metal bands onto a planar guide (5), and a clamping device (40) which on both sides hold the metal band packet (7) close to an area being ground.

* * * * *